US012699606B2

(12) United States Patent
Tsuchihashi

(10) Patent No.: US 12,699,606 B2
(45) Date of Patent: Aug. 4, 2026

(54) ELECTRONIC DEVICE, CONTROL METHOD, AND STORAGE MEDIUM

(71) Applicant: CANON KABUSHIKI KAISHA, Tokyo (JP)

(72) Inventor: Masakazu Tsuchihashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 549 days.

(21) Appl. No.: 18/151,055

(22) Filed: Jan. 6, 2023

(65) Prior Publication Data

US 2023/0222022 A1 Jul. 13, 2023

(30) Foreign Application Priority Data

Jan. 12, 2022 (JP) ................................ 2022-003253

(51) Int. Cl.
*G06F 9/54* (2006.01)
*H04L 67/02* (2022.01)

(52) U.S. Cl.
CPC .............. *G06F 9/547* (2013.01); *H04L 67/02* (2013.01)

(58) Field of Classification Search
None
See application file for complete search history.

(56) References Cited

U.S. PATENT DOCUMENTS 10,581,871 B1 * 3/2020 Dehoumon ............. H04L 67/02
2012/0278598 A1 * 11/2012 Wang .................... G06F 21/575
713/2
2019/0317887 A1 * 10/2019 Wiener ................. G06F 11/368
2021/0337008 A1 * 10/2021 Thomas, III .......... H04L 63/029

FOREIGN PATENT DOCUMENTS

JP 2019075144 A 5/2019
JP 2021150933 A 9/2021

OTHER PUBLICATIONS

Allen, Brock. "ASP.NET Web API-CORS Support in ASP.NET Web API 2" MSDN Magazine, Dec. 2013, col. 28, No. 12. Accessed via Microsoft Learn Archive at https://learn.microsoft.com/en-us/archive/msdn-magazine/2013/december/asp-net-web-api-cors-support-in-asp-net-web-api-2 (p. 1-17). (Year: 2013).*

"IEEE Standard Protocol for Stream Management in Media Client Devices," in IEEE Std 2200-2012 , vol. No. , pp. 1-196, Aug. 9, 2012 (Year: 2012).*

Y. Cao, V. Rastogi, Z. Li, Y. Chen and A. Moshchuk, "Redefining web browser principals with a Configurable Origin Policy," 2013 43rd Annual IEEE/IFIP International Conference on Dependable Systems and Networks (DSN), Budapest, Hungary, 2013, pp. 1-12 . (Year: 2013).*

Dresen, Christian, Fabian Ising, Damian Poddebniak, Tobias Kappert, Thorsten Holz, and Sebastian Schinzel. "Corsica: Cross-origin web service identification." In Proceedings of the 15th ACM Asia Conference on Computer and Communications Security, pp. 409-419. 2020. (Year: 2020).*

* cited by examiner

*Primary Examiner* — Frank D Mills
(74) *Attorney, Agent, or Firm* — Canon U.S.A., Inc. IP Division

(57) ABSTRACT

An electronic device publishes an application programming interface (API) for a setting related to CORS in which a setting that is related to enabling or disabling of cross-origin resource sharing (CORS) is included, and in a case where a Hypertext Transfer Protocol (HTTP) request for the API is received from another device, executes the setting related to CORS based on the request.

9 Claims, 9 Drawing Sheets

| URL | method | request | response | DESCRIPTION | |
|---|---|---|---|---|---|
| http://xxx/ | GET | — | 200OK<br>{"path":[<br>"/xxx/cors/corssetting",<br>"/xxx/cors/origin",<br>"/xxx/cors/header",<br>"/xxx/control/shutter"]} | RETURN A LIST OF APIs THAT CAN BE USED | 401 |
| http://xxx/cors/corssetting | PUT | {"value":"enable"} | 200 OK<br>{"value":"enable"} | SET ENABLING/DISABLING OF CORS PROCESSING | 402 |
| http://xxx/cors/origin | PUT | {"origin":"http://example.com:80"} | 200 OK<br>{"origin":"http://example.com:80"} | DESIGNATE ALLOWED ORIGIN | 403 |
| http://xxx/cors/header | PUT | {"header_key":"Header-example", "header_value":"header"} | 200 OK<br>{"header_key":"Header-example", "header_value":"header"} | ADD ALLOWED HEADER | 404 |
| ... | | | | | |
| http://xxx/cors/shutter | POST | {"action":"full_press"} | 200 OK | OPERATE SHUTTER BUTTON | 405 |
| ... | | | | | |
| EACH URL | OPTIONS | — | 204 No Content | RETURN METHOD THAT IS SUPPORTED BY EACH API<br><br>ONLY WHEN CORS PROCESSING IS ENABLED, RESPOND TO CORS PREFLIGHT REQUEST. | 406 |

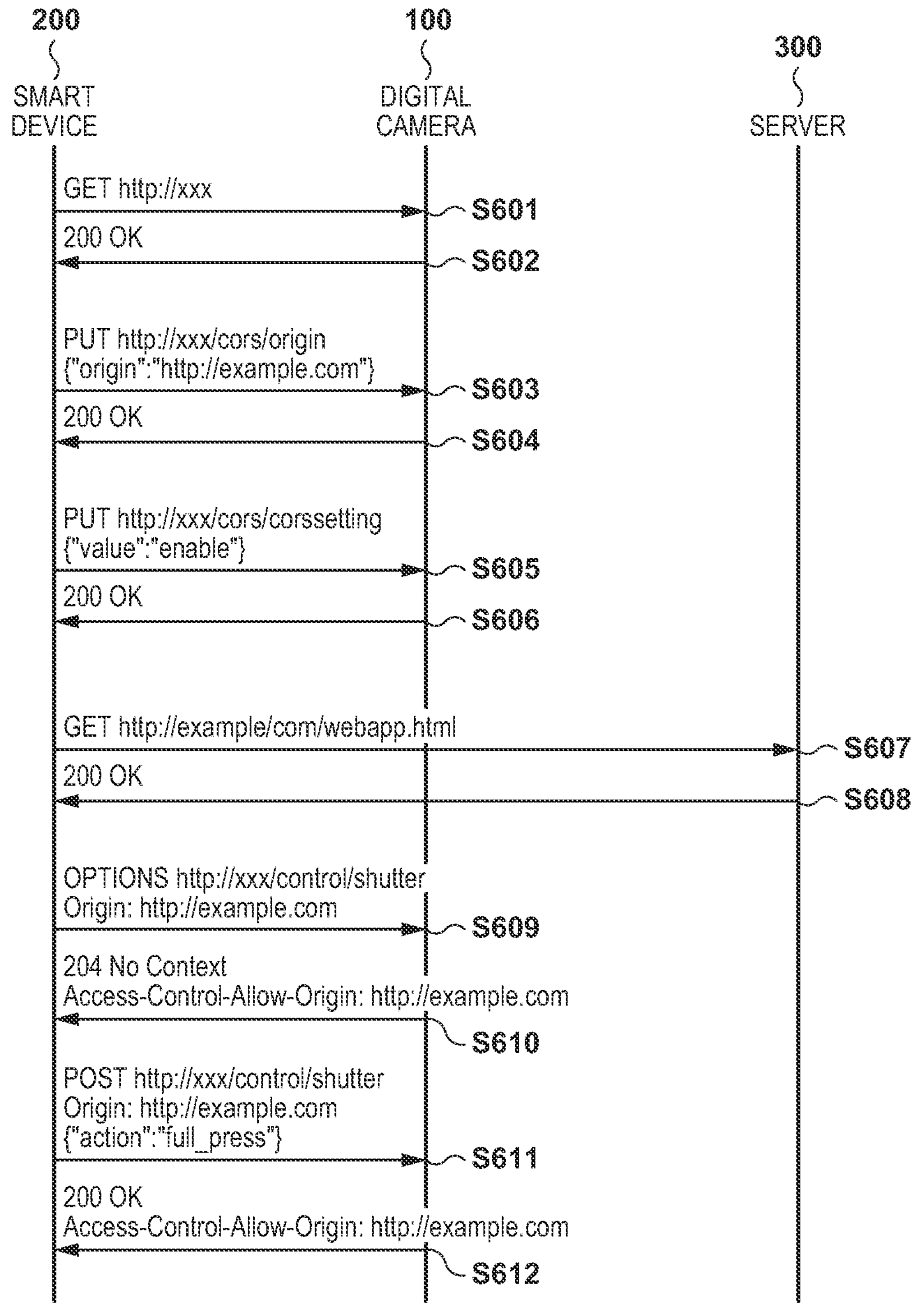

F I G. 6

200
SMART
DEVICE

100
DIGITAL
CAMERA

300
SERVER

GET http://xxx — S601

200 OK — S602

PUT http://xxx/cors/origin
{"origin":"http://example.com"} — S603

200 OK — S604

PUT http://xxx/cors/corssetting
{"value":"enable"} — S605

200 OK — S606

GET http://example/com/webapp.html — S607

200 OK — S608

OPTIONS http://xxx/control/shutter
Origin: http://example.com — S609

204 No Context
Access-Control-Allow-Origin: http://example.com — S610

POST http://xxx/control/shutter
Origin: http://example.com
{"action":"full_press"} — S611

200 OK
Access-Control-Allow-Origin: http://example.com — S612

FIG. 8

| URL | method | request | response | DESCRIPTION | |
|---|---|---|---|---|---|
| http://xxx/cors/api/corssetting | PUT | {"path":"/xxx/control/shutter", "value":"enable"} | 200 OK {"path":"/xxx/control/shutter", "value":"enable"} | SET ENABLING/DISABLING OF CORS PROCESSING OF DESIGNATED API | 801 |
| http://xxx/cors/api/origin | PUT | {"path":"/xxx/control/shutter", "origin":"http://example.com:80"} | 200 OK {"path":"/xxx/control/shutter", "origin":"http://example.com:80"} | DESIGNATE ALLOWED ORIGIN OF DESIGNATED API | 802 |
| http://xxx/cors/api/header | PUT | {"path":"/xxx/control/shutter", "header_key":"Header-example", "header_value":"header"} | 200 OK {"path":"/xxx/control/shutter", "header_key":"Header-example", "header_value":"header"} | ADD ALLOWED HEADER OF DESIGNATED API | 803 |
| ... | | | | | |

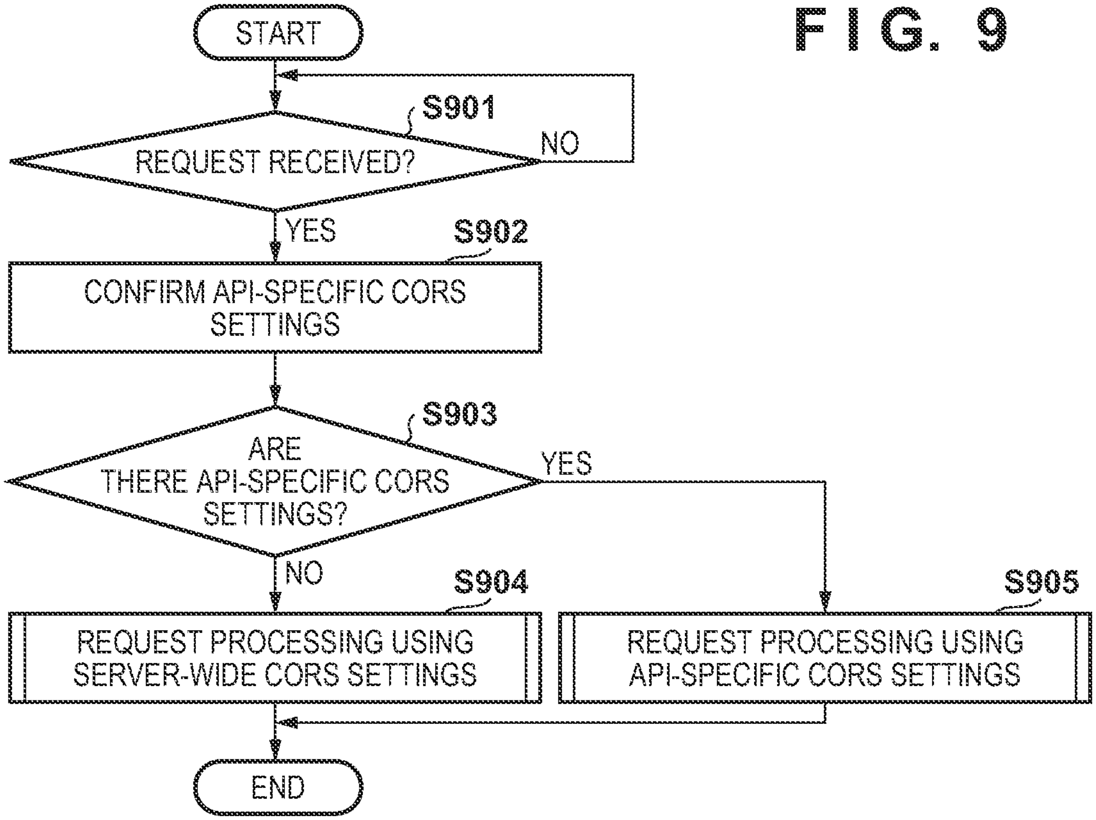
FIG. 9
FIG. 10
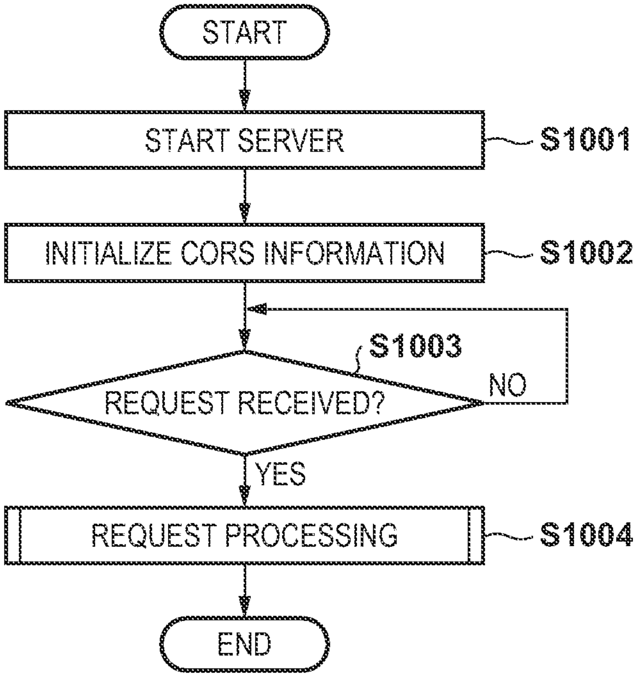

ELECTRONIC DEVICE, CONTROL METHOD, AND STORAGE MEDIUM

BACKGROUND

Field

The present disclosure generally relates to a technique for setting cross-origin resource sharing (CORS) across electronic devices and, more particularly, to an electronic device, control method, and storage medium.

Description of the Related Art

A camera function and a communication function are mounted in many electronic devices, such as personal computers, digital cameras, game consoles, tablet terminals, and mobile phones, and it has become common to exchange data between these electronic devices. Some electronic devices are equipped with a server function and publish, as an application programming interface (API), functions for changing settings and obtaining internal data and the like. External devices different from these electronic devices can externally utilize such functions by using an API. For example, by transmitting a request to an electronic device by using an API published thereby, an external device may control an operation of an electronic device or obtain device information or a content data file from the electronic device. By using this mechanism, it is also possible to construct an application or system for remotely controlling an electronic device.

One form of application is a web application for which a web browser is used. A web application functions by a file, such as a Hypertext Markup Language (HTML) or JavaScript® file, that has been obtained from a web server, being caused to run on a web browser. Here, while the web application is running, the web browser blocks access to origins that differ from an origin that is an issuing source of the web application in accordance with a same-origin policy. Meanwhile, when constructing a system that operates an electronic device by using a web application, an origin of a web server that publishes the web application may differ from an origin of the electronic device. For this reason, cases where a request cannot be transmitted to the electronic device by using a web application due to a same-origin policy restriction are anticipated.

There is a mechanism called cross-origin resource sharing (CORS) for partially disabling a same-origin policy. In CORS, for example, when a server receives a request from a web application of a different origin, the server determines whether to allow the request, and if the server allows the request, it becomes possible to access that server from the web application. By an electronic device that is a request destination server supporting CORS, it becomes possible to transmit a request from a web browser to the electronic device in a system that uses a web application as described above. Japanese Patent Laid-Open No. 2019-75144 describes a technique for allowing cross-domain communication by using CORS.

In order to communicate between different origins according to CORS, CORS settings are performed on a request destination server. Meanwhile, if an electronic device that is functioning as a server is not provided with a rich user interface for accepting operation input by a user, it may not be possible to perform settings. Such an electronic device can perform processing according to CORS by holding fixed CORS settings. However, it is not easy to deal with cases where CORS settings need to be changed due to an origin being periodically changed, and therefore, it is less convenient.

SUMMARY

The present disclosure provides a technique for enhancing convenience in CORS settings in an electronic device.

According to some embodiments, an electronic device includes one or more processors and one or more memories that store computer-readable instructions for causing, when executed by the one or more processors, the electronic device to perform steps including publishing an application programming interface (API) for a setting related to CORS in which a setting that is related to enabling or disabling of cross-origin resource sharing (CORS) is included; and in a case where a Hypertext Transfer Protocol (HTTP) request for the API is received from another device, executing the setting related to CORS based on the request.

Further features of the present disclosure will become apparent from the following description of exemplary embodiments with reference to the attached drawings.

BRIEF DESCRIPTION OF THE DRAWINGS

FIG. 4 is a diagram illustrating an example of APIs to be provided by a transmission-side electronic device.

FIG. 6 is a diagram illustrating an example of a flow of processing to be performed by the system.

FIG. 8 is a diagram illustrating an example of APIs to be provided by a transmission-side electronic device.

FIG. 9 is a diagram illustrating an example of a flow of processing to be performed by the digital camera.

FIG. 10 is a diagram illustrating an example of a flow of processing to be performed by the digital camera.

DESCRIPTION OF THE EMBODIMENTS

Figure 1:
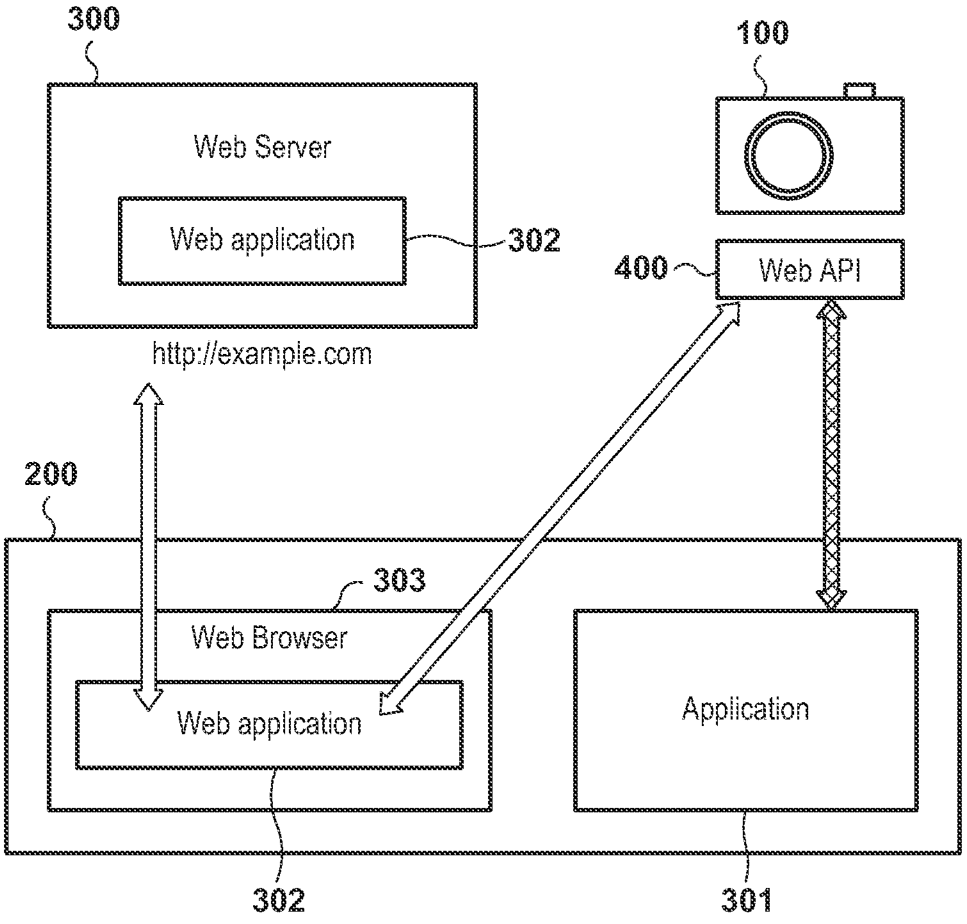
FIG. 1 is a diagram illustrating an example of a configuration of a system.

Hereinafter, embodiments will be described in detail with reference to the attached drawings. Note, the following embodiments are not intended to limit the scope of the claimed disclosure. Multiple features are described in the embodiments, but limitation is not made to a disclosure that uses all such features, and multiple such features may be combined as appropriate. Furthermore, in the attached drawings, the same reference numerals are given to the same or similar configurations, and redundant description thereof is omitted.

<Configuration of System>

FIG. 1 illustrates an example of a configuration of a system according to the present embodiment. The system of the present embodiment is configured to include a digital camera 100, a smart device 200, and a web server 300. These are only examples of electronic devices, and electronic devices of other forms may be used. For example, here the digital camera 100 is an example of an electronic device that is capable of functioning as a server and is provided with a relatively poor user interface for accepting information input from a user; the digital camera 100 may be a device of another form, such as a scanner or printer, for example. The smart device 200 is an example of an electronic device that includes a web browser and on which a web application can be used; the smart device 200 may be, for example, a smartphone but may also be an electronic device of another form, such as a personal digital assistant (PDA), for example. The digital camera 100 and the smart device 200 may be, for example, information processing devices, such as portable media players, tablet devices, or personal computers (PCs). The web server 300 is an example of a server that is capable of providing a web application and may be implemented by a general purpose computer or the like but may also be an electronic device of any form that includes similar functions.

It is assumed that the digital camera 100 and the smart device 200 are configured to be capable of communication, for example, via a network or directly. It is also assumed that the smart device 200 and the web server 300 are configured to be capable of communication, for example, via a network or directly. In one example, the smart device 200 may be directly connected to the digital camera 100 and connected to the web server 300 via a network, such as the Internet. The smart device 200 may also be directly connected to the web server 300 and connected to the digital camera 100 via a network, such as the Internet. The smart device 200 may also communicate with both the digital camera 100 and the web server 300 directly or via a network. When the smart device 200 connects to the digital camera 100 and the web server 300 via a network, the smart device 200 may connect via a common network or may connect to each via two individual networks. Although it will not be mentioned in the present embodiment, the digital camera 100 may connect to the web server 300. As described above, the digital camera 100, the smart device 200, and the web server 300 are communication devices that are capable of communicating with each other. These devices are configured so as to be capable of communication by using, for example, a protocol by which web information can be exchanged, and in the present embodiment, are assumed to be capable of using at least Hypertext Transfer Protocol (HTTP).

In the present embodiment, as one example, it is assumed that the digital camera 100 includes a server function and publishes an API 400. API is an abbreviation of application programming interface. The smart device 200 includes an application 301 for operating the API 400 of the digital camera 100. The user can transmit a request for the API 400 of the digital camera 100 by operating the application 301. Meanwhile, it is assumed that the web server 300 holds a web application 302 for operating the API 400 of the digital camera 100. The web application 302 is configured by, for example, a Hypertext Markup Language (HTML) file or a JavaScript® file. In response to a request from a client, the web server 300 can provide to the client a file for configuring the web application 302 as a response. In the present embodiment, the smart device 200 includes a web browser 303, and by the user accessing the web server 300 by using the web browser 303, a file for configuring the web application 302 is loaded into the web browser 303. The user can transmit a request for the API 400 of the digital camera 100 by operating the loaded web application 302.

Meanwhile, since an issuing source of the web application 302 is the web server 300, due to restrictions of the same-origin policy, it is anticipated that the web browser 303 will not be able to transmit a request to the digital camera 100. An origin is configured by a combination of a scheme ("http"), a host ("example.com"), and a port number ("80"), such as http://example.com:80, for example. If there is even one varying element when elements of each of two origins are compared, it is determined that the two origins are different origins.

As described above, cross-origin resource sharing (CORS) may be used for disabling restrictions of the same-origin policy. When CORS is used, for example, the web application 302 adds particular information to an HTTP header and then transmits a request for the API 400 of the server (the digital camera 100). The request destination server (digital camera 100) performs control for allowing access from an origin of the web application 302. An "Origin" header is added to a request from a different origin, and a value of the Origin header is set to an origin (the origin of the web application 302) of a transmission source of the request. For example, this header is added by a JavaScript engine of the web browser 303. When the server (digital camera 100) receives the request, the server confirms the Origin header and determines whether to allow the request from that origin. The server holds information (a list) of origins from which to allow requests, for example, and determines whether to allow the request by comparing a value of the Origin header with the held information of origins. When allowing the request, the server adds an "Access-Control-Allow-Origin" header and then returns a response to the transmission source (smart device 200) of the request. A value in such a case is set to the value of the Origin header. Meanwhile, when not allowing the request, the server returns a response without adding the "Access-Control-Allow-Origin" header. In such a case, it is recommended to respond with a response message for which a status code has been set to "403 Forbidden".

Also, in a case of a request that is determined to have a significant influence on the server among requests from different origins based on a method or contents of a header, it is possible to not immediately transmit the request, and rather first transmit a preflight request. A preflight request is transmitted by a web browser to the server with an OPTIONS method. A preflight request is made to confirm in advance whether the server allows requests from that different origin. A preflight request is also transmitted with an Origin header added, and the server determines whether to allow access in accordance with a value thereof. When allowing access, the server returns a response to which an "Access-Control-Allow-Origin" header has been added. Meanwhile, when not allowing access, the server returns a response to which an "Access-Control-Allow-Origin" header has not been added.

When using CORS, it is normal to perform in advance CORS settings on the server. The CORS settings include, for example, designation of an origin for which access is allowed, setting of an HTTP method for which access is allowed, setting of an HTTP header for which access is allowed, and the like. These settings are generally externally inputted by using a console or the like.

Meanwhile, there are cases where it is not possible to use an external console for some electronic devices, such as the digital camera 100, and even if they include an interface for inputting information, that input interface may not be sufficient, and thereby setting work may become complicated. For this reason, in the present embodiment, a technique for improving convenience for CORS settings in such a server (electronic device) in which an input interface is not sufficient is provided. A configuration and processing, which will be described in the present embodiment, are extremely useful for electronic devices that do not have a sufficient input interface; however, it should also be noted that they are also useful for electronic devices that have a rich input interface and have an excellent capability for accepting user operations.

<Configuration of Digital Camera 100>

Figure 2:
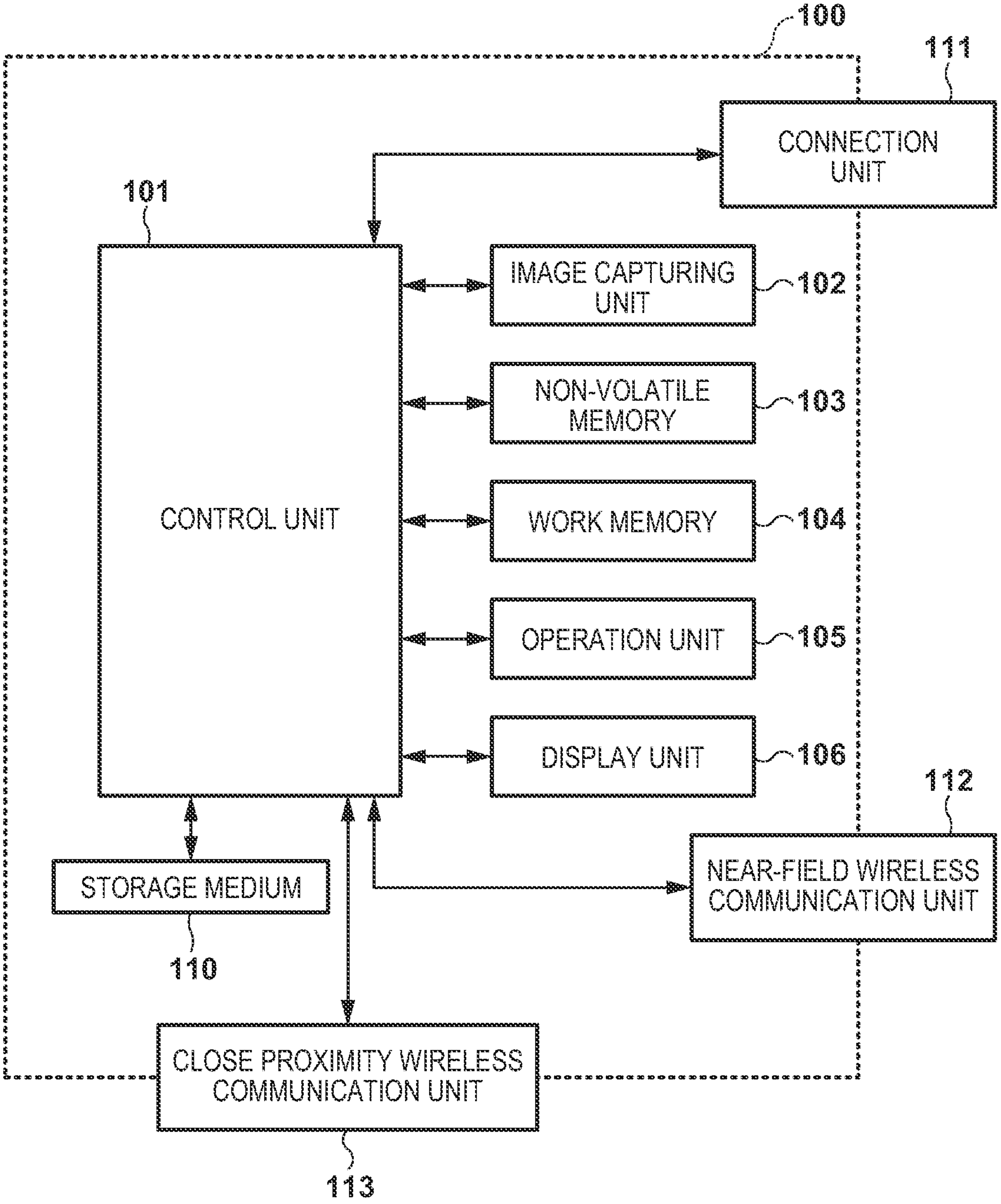
FIG. 2 is a diagram illustrating an example of a configuration of a digital camera.

FIG. 2 illustrates an example of a configuration of the digital camera 100. The digital camera 100 is configured to include, for example, a control unit 101, an image capturing unit 102, a non-volatile memory 103, a work memory 104, an operation unit 105, a display unit 106, a storage medium 110, a connection unit 111, a near-field wireless communication unit 112, and a close proximity wireless communication unit 113.

The control unit 101 is configured to include, for example, a processor, such as a CPU or a MPU. CPU is an abbreviation of central processing unit, and MPU is an abbreviation of micro processing unit. A multi-core processor may also be used, and the control unit 101 may be configured by one or more processors. The control unit 101 may also be configured to include, for example, a field programmable gate array (FPGA), a digital signal processor (DSP), an application-specific integrated circuit (ASIC), and the like. The control unit 101 controls respective functional units of the digital camera 100 in accordance with, for example, inputted signals and programs, which will be described later. Instead of the control unit 101 controlling the entire device, a plurality of pieces of hardware that include the control unit 101 or are external to the control unit 101 may control the entire device by division of processing.

The image capturing unit 102 is configured to include an optical system for controlling an optical lens unit and aperture, zoom, focus, and the like, an image capturing element for converting light (image) that has been introduced via the optical lens unit into an electrical video signal, or the like, for example. A complementary metal-oxide semiconductor (CMOS) or a charge-coupled device (CCD) is generally used for the image capturing element. The image capturing unit 102 converts light from a subject that has been formed into an image by the lens into an electric signal by the image capturing element, performs noise reduction processing and the like, and outputs digital data as image data under the control of the control unit 101. The digital camera 100 of the present embodiment stores image data in the storage medium 110 in accordance with a Design rule for Camera File system (DCF) standard, for example.

The non-volatile memory 103 is a non-volatile memory that can be electrically erased and recorded and stores later-described programs to be executed in the control unit 101 and the like. The non-volatile memory 103 may be configured by, for example, a read-only memory (ROM). The work memory 104 is a memory that is used as a buffer memory for temporarily holding image data that has been captured by the image capturing unit 102, a memory for image display of the display unit 106, a work area of the control unit 101, or the like. The work memory 104 may be configured by, for example, a random access memory (RAM).

The operation unit 105 is used for receiving an operation or an instruction for the digital camera 100 from the user.

The operation unit 105 includes, for example, a power button for the user to make an instruction to turn on/off the power of the digital camera 100, a release switch for instructing image capturing, and a reproduction button for instructing reproduction of image data. The operation unit 105 may include, for example, an operation member, such as a dedicated connection button for starting communication with an external device via the connection unit 111. The release switch includes an SW 1 and an SW 2. The SW 1 is turned on by the release switch entering a so-called half-pressed state. Thus, an instruction for performing preparation for image capturing, such as autofocus (AF) processing, auto exposure (AE) processing, auto white balance (AWB) processing, or pre-flash (EF) processing is accepted. The SW 2 is turned on by the release switch entering a so-called fully-pressed state. Thus, an instruction for performing image capturing is accepted. The display unit 106 is configured by, for example, a liquid crystal monitor and performs a display of a viewfinder image at the time of image capturing, a display of captured image data, a character display for interactive operation, and the like. The digital camera 100 does not necessarily need to incorporate the display unit 106. That is, the digital camera 100 can connect to the display unit 106, such as an external display, in place of or in addition to the built-in display unit 106 and may include a display control function for controlling screen display in the display unit 106. The operation unit 105 and the display unit 106 may be configured integrally by using a touch panel display or the like.

The storage medium 110 can store image data that has been outputted from the image capturing unit 102. The storage medium 110 may be configured to be capable of being attached to and detached from the digital camera 100 or may be incorporated in the digital camera 100. That is, the storage medium 110 may be, for example, an external memory, such as an SD card memory or a USB memory, and in such a case, the digital camera 100 may include an interface for connecting such an external memory and a function for control thereof. The storage medium 110 may also be configured by a storage device, such as a built-in solid-state drive (SSD), a hard disk drive (HDD), or a memory, for example.

The connection unit 111 is configured to include an interface for connecting an external device to the digital camera 100 and a function for control thereof. The digital camera 100 can transfer data to and from an external device via the connection unit 111, for example. For example, image data that has been generated by the image capturing unit 102 may be transmitted to an external device via the connection unit 111. In one example, the connection unit 111 may include a wireless LAN communication interface that conforms to an Institute of Electrical and Electronics Engineers (IEEE) 802.11 standard series. In such a case, the control unit 101 may establish a wireless connection with an external device and execute wireless communication by controlling the connection unit 111. A wireless LAN is one example, and the connection unit 111 may have a function of connection by a wired method, such as infrared communication or Ethernet®, for example.

The near-field wireless communication unit 112 is configured to include, for example, an antenna for wireless communication, a modulation/demodulation circuit for processing a wireless signal, and a communication controller. The near-field wireless communication unit 112 performs, for example, wireless communication that conforms to an IEEE 802.15 standard (a so-called Bluetooth®) by outputting a modulated wireless signal from the antenna and also demodulating a wireless signal that has been received by the antenna. In one example, the near-field wireless communication unit 112 may use version 4.0 of Bluetooth Low Energy (BLE), which is a low-power wireless communication standard. The distance over which communication is possible is shorter and the range over which communication is possible is narrower for communication that uses Bluetooth compared to communication that uses a wireless LAN. Communication speed is also lower for communication that uses Bluetooth compared to communication that uses a wireless LAN. Meanwhile, power consumption is lower for communication that uses Bluetooth compared to communication that uses a wireless LAN. The digital camera 100 can exchange data with an external device via the near-field wireless communication unit 112. In one example, when the digital camera 100 receives a command for image capturing from an external device, the digital camera 100 performs an image capturing operation by controlling the image capturing unit 102, and when the digital camera 100 receives a command for exchange of data by communication that uses a wireless LAN, the digital camera 100 executes wireless LAN communication by controlling the connection unit 111.

The close proximity wireless communication unit 113 is configured to include, for example, an antenna for wireless communication, a modulation/demodulation circuit for processing a wireless signal, and a communication controller. The close proximity wireless communication unit 113 outputs a modulated wireless signal from the antenna and also demodulates a wireless signal that has been received by the antenna. Thus, the close proximity wireless communication unit 113 performs non-contact close proximity communication that conforms to an ISO/IEC 18092 standard (so-called near-field communication (NFC)), for example. This is only an example, and the close proximity wireless communication unit 113 may be configured to perform communication that conforms to another wireless communication standard other than NFC. For example, the close proximity wireless communication unit 113 may be configured to perform non-contact close proximity communication that conforms to an ISO/IEC 14443 standard. The close proximity wireless communication unit 113 is disposed on a side of the digital camera 100, for example. For example, by bringing the close proximity wireless communication unit 113 into close proximity with a close proximity wireless communication unit of the external device, a connection with an external device is established and then communication is executed. In a connection that uses the close proximity wireless communication unit 113, it is not necessary to bring the close proximity wireless communication unit of the external device into contact with the close proximity wireless communication unit 113. That is, regarding communication according to a close proximity wireless standard, such as NFC, communication can be executed even if the units are a certain distance apart. Therefore, in order to establish a connection, it is sufficient that two communication devices that perform close proximity wireless communication be brought within the range in which communication can be executed of each other. In the following description, bringing communication devices within a range in which close proximity wireless communication is possible of each other is referred to as "bringing the devices into close proximity". Even if two communication devices both include a close proximity wireless communication unit, if the distance between the close proximity wireless communication units of the two communication devices large enough that close proximity wireless communication is not possible, communication will not be started. In addition, while the distance between close proximity wireless communication units of two communication devices is sufficiently short and a connection is established, if the close proximity wireless communication units become separated to an extent that close proximity wireless communication can no longer be executed, the connection will be disconnected.

A plurality of communication functions of the digital camera 100 may be configured to share one or a small number of antennas, or an individual antenna may be provided for each communication function.

Assuming that the connection unit 111 provides wireless LAN communication, generally, a communication speed of communication that uses the connection unit 111 will be higher than a communication speed of communication that uses the close proximity wireless communication unit 113. A range of the connection unit 111 in which communication is possible is wider than a range of the close proximity wireless communication unit 113 in which communication is possible. Meanwhile, since the close proximity wireless communication unit 113 can limit what devices can be communication partners by the narrowness of the range in which communication is possible, the close proximity wireless communication unit 113 does not need processing, such as an exchange of cryptographic keys that is used in communication that uses the connection unit 111. That is, the close proximity wireless communication unit 113 can perform communication of a low processing load as compared with a case of using the connection unit 111. In wireless LAN communication, the connection unit 111 may be able to operate in an AP mode in which the connection unit 111 operates as an access point (AP) in an infrastructure mode and in a CL mode in which the connection unit 111 operates as a client (CL) in the infrastructure mode. The digital camera 100 can operate as a CL device in the infrastructure mode by causing the connection unit 111 to operate in the CL mode. When operating as a CL device, the digital camera 100 can join a network that is formed by a neighboring AP device by connecting to that AP device. The digital camera 100 may also form a network by causing the connection unit 111 to operate in the AP mode and cause devices that are neighboring the digital camera 100 to join the network. In such a case, despite being a type of AP, the digital camera 100 may operate as a simple AP with limited functions. A simple AP is, for example, an AP that does not include a gateway function for transferring data that has been received from a CL device to an Internet provider or the like. In such a case, even if a simple AP receives data from another device that has joined the network that the AP itself has formed, the simple AP cannot transfer the data to a network, such as the Internet. However, in a case such as when the digital camera 100 is wire-connected to a network, for example, the digital camera 100 may be configured so as to be capable of functioning not as a simple AP but as a normal AP that includes a gateway function.

<Internal Configuration of Smart Device 200>

Figure 3:
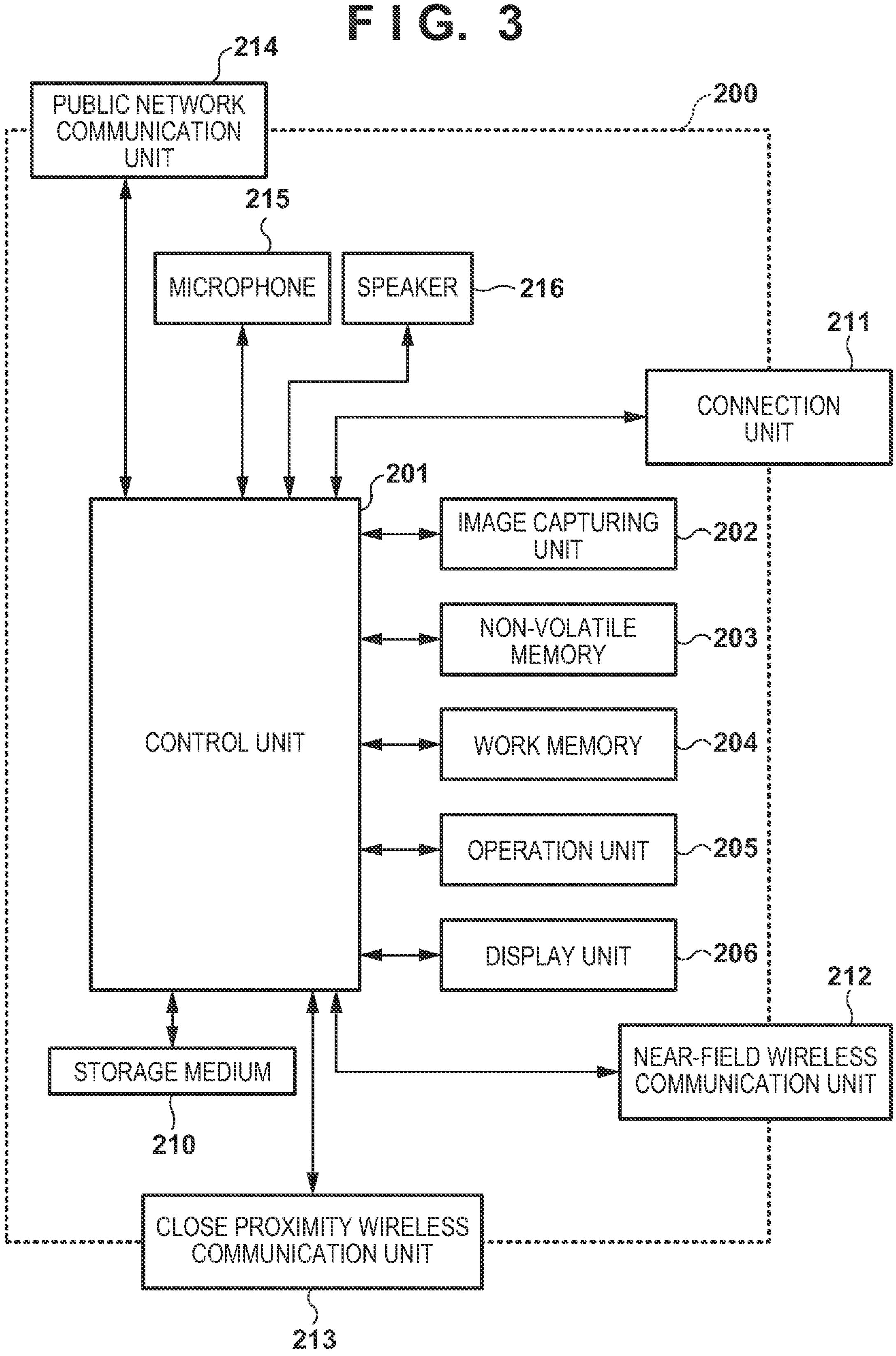
FIG. 3 is a diagram illustrating an example of a configuration of a smart device.

FIG. 3 illustrates an example of a configuration of the smart device 200. The smart device 200 is configured to include, for example, a control unit 201, an image capturing unit 202, a non-volatile memory 203, a work memory 204, an operation unit 205, a display unit 206, a storage medium 210, a connection unit 211, a near-field wireless communication unit 212, and a close proximity wireless communication unit 213. Since these functional units are similar to the respective functional units which have been assigned the same names in the digital camera 100, descriptions thereof will be omitted. In one example, the smart device 200 is further configured to include a public network communication unit 214, a microphone 215, and a speaker 216.

The public network communication unit 214 is configured to include, for example, an antenna for wireless communication, a modulation/demodulation circuit for processing a wireless signal, and a communication controller. The public network communication unit 214 provides a communication interface for establishing a connection with, for example, a base station of a cellular communication system or another terminal and performing wireless communication over a public network. The microphone 215 is an interface that accepts audio input, and the speaker 216 is an interface for audio output. The smart device 200 may provide a call function by connecting to a base station of a public network via the public network communication unit 214 and by inputting and outputting audio signals via the microphone 215 and the speaker 216 under the control of the control unit 201, for example. A plurality of communication functions of the smart device 200 may be configured to share one or a small number of antennas, or an individual antenna may be provided for each communication function.

<Configuration of APIs for Controlling Digital Camera from External Device>

In the present embodiment, the digital camera 100 provides APIs for controlling the digital camera 100 itself by an external device. In particular, in the present embodiment, APIs that allow CORS settings of the digital camera 100 is provided. An external device (e.g., the smart device 200) that differs from the digital camera 100 can control an operation of the digital camera 100 by transmitting a request to the digital camera 100 by using those APIs. The external device can also realize obtainment of device information and a content data file from the digital camera 100 by using those APIs. These APIs will be described with reference to FIG. 4.

An API is stored in advance as a program in the non-volatile memory 103 of the digital camera 100. Then, in the digital camera 100, when communication with an external device is established via the connection unit 111, the API is loaded into the work memory 104 by the control unit 101, and an API request from the external device is awaited. Then, when the control unit 101 detects an API request from the external device, the control unit 101 executes processing in accordance with a type of the requested API and returns a result to the external device as a response. The API is executed on a communication protocol that has been specified by the digital camera 100, and the external device communicates with the digital camera 100 using that specified communication protocol and makes an API request. In the present embodiment, a description will be given assuming that an API request and response are performed by using HTTP; however, another communication protocol may be used. Since HTTP is known, it will not be described here. An API request that uses HTTP is performed by transmission, using a GET, PUT, or POST method, in relation to a URL of an API, which is for an external device to use, where arguments are described in an HTTP request body in a JSON format. URL is an abbreviation of Uniform Resource Locator, and JSON is an abbreviation of JavaScript Object Notation. A result of processing related to the requested API is added to the HTTP response body and returned to the external device.

An API list 400 of FIG. 4 indicates types and contents of APIs that are published by the digital camera 100. In FIG. 4, six APIs are indicated for convenience; however, the number of published APIs is not limited to six, and these six APIs do not always need be used. That is, the APIs that are described here are only examples of APIs that are published by the digital camera 100, and APIs other than the six APIs that are indicated below may be published, and configuration may be such that one or more of the six APIs that are indicated below are not published.

An API 401 is an API that returns a list of URLs of APIs that are published by the digital camera 100. By making a request for this API to the digital camera 100 without arguments, an external device can obtain URLs of all the APIs that are published by the digital camera 100 as an array that is described in the JSON format.

An API 402 (/cors/corssetting) is an API for switching whether to enable or disable CORS processing to be performed by the digital camera 100. An external device adds, to a request body, information ("enable") that indicates that CORS processing is to be enabled or information ("disable") that indicates that CORS processing is to be disabled and transmits the request by the PUT method. The digital camera 100 holds information of the request in the work memory 104 and uses this information when determining whether to perform CORS processing at the time of subsequent request reception. If the digital camera 100 successfully completes storing of the information, the digital camera 100 adds, to a response body, changed information that indicates a state of CORS processing and returns "200 OK" as a status code to the external device.

An API 403 (/cors/origin) is an API for designating an "allowed origin" to be used when determining whether to allow a response to a request from a different origin at the time of CORS processing. An external device adds, to a request body, information that indicates an allowed origin and transmits a request by the PUT method. The digital camera 100 holds information of the request in the work memory 104 and uses this information when determining whether to allow a response in CORS processing at the time of subsequent request reception. If the digital camera 100 successfully completes storage of the information, the digital camera 100 adds, to a response body, changed information that indicates an allowed origin and returns "200 OK" as a status code to the external device.

An API 404 (/cors/header) is an API for adding an "allowed header", which is used when determining whether to allow a response to a request from a different origin at the time of CORS processing. An external device adds, to a request body, a key and a value of an allowed header and transmits a request by the PUT method. The digital camera 100 holds information of the request in the work memory 104 and uses thigs information when determining whether to allow a response in CORS processing at the time of subsequent request reception. If the digital camera 100 successfully completes storage of the information, the digital camera 100 adds, to a response body, information that indicates a header that has been added as an allowed header and returns "200 OK" as a status code to the external device.

An API 405 (/control/shutter) is an API for operating the shutter button of the digital camera 100. According to this API, a full press ("full_press"), a half press ("half_press"), and a release ("release"), for example, can be designated as operations of the shutter button. An external device adds, to a request body, information that indicates an operation of the shutter button and transmits a request by the POST method. The digital camera 100 performs an operation of the shutter button in accordance with information of the request. For example, when the digital camera 100 receives an instruction for a full press, the digital camera 100 captures a photograph. When the operation of the shutter button is completed normally, the digital camera 100 returns an operation result to the external device without including a response body.

An API 406 is an API for obtaining a support state of each API that is published by the digital camera 100. An external device may make a request by an OPTIONS method for each API. In a case where CORS processing is disabled or if a request header has no origin header, the digital camera 100 returns to the external device a response in which a method that is supported by that API is attached to an "Allow" header added. In such a case, a status code is set to "204 No Content". In a case where the digital camera 100 determines that CORS processing is enabled and a response is allowed, the digital camera 100 returns a response based on the information of an "allowed origin" and an "allowed header" that are held in the work memory 104. For example, information is added to the "Access-Control-Allow-Origin" header, and a response for which a status code is set to "204 No Content" is returned to the external device. For example, a configuration may also be taken so as to add information to the "Access-Control-Allow-Header" header and return to the external device a response for which a status code is set to "204 No Content". A response to a preflight request that a web browser transmits when making a request to a different origin is performed using the API 406.

If communication between the digital camera 100 and the smart device 200 is performed by HTTP, transferring of arguments may be performed by a query string. A query string is a method that enables data to be added to a URL, and argument data may be described by a "?" and a "variable=parameter" at the end of URL by using this method.

<Processing at Time of Request Reception>

Figure 5:
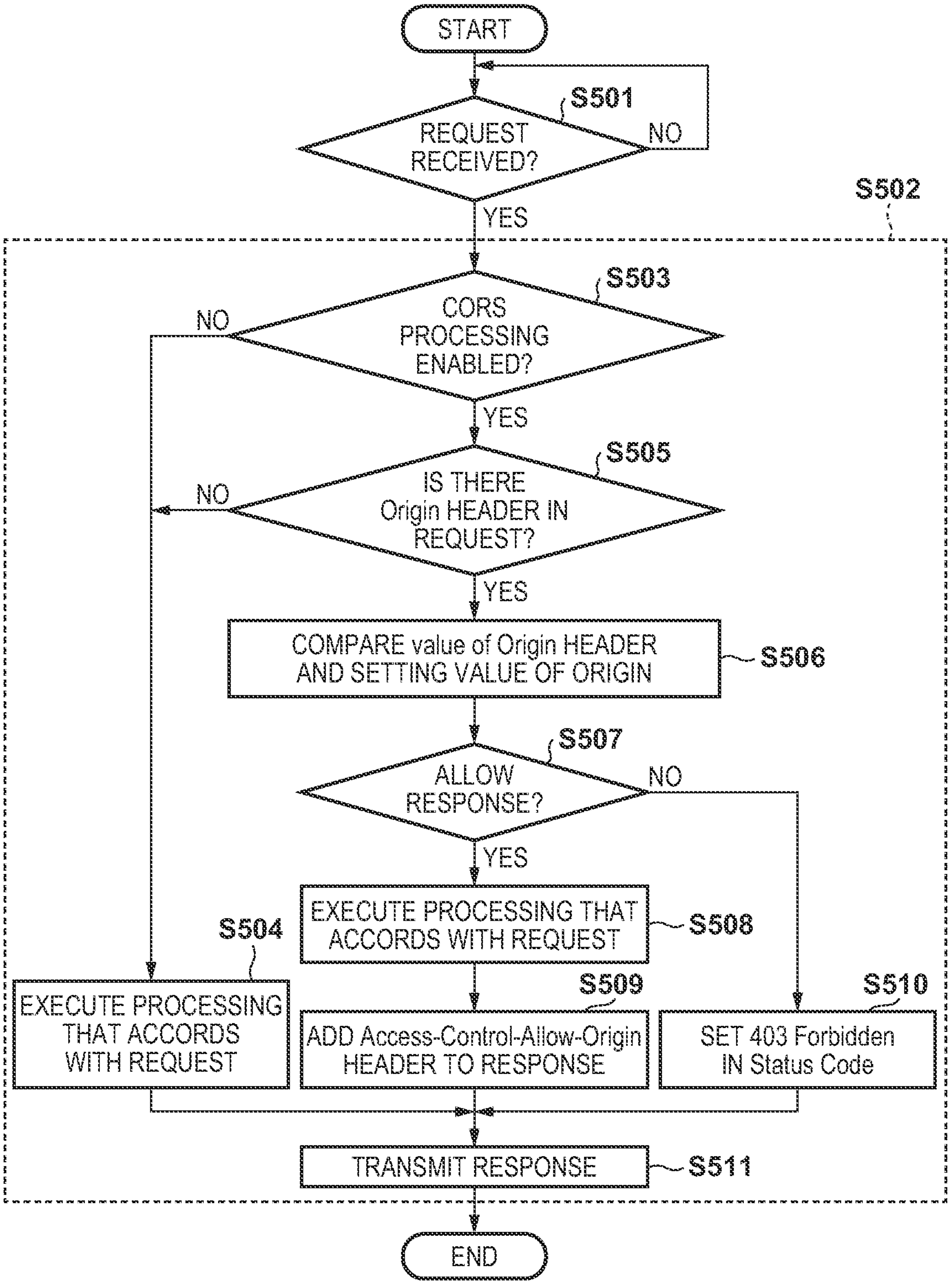
FIG. 5 is a diagram illustrating an example of a flow of processing to be performed by the digital camera.

Next, an example of a flow of processing of the digital camera 100 for when a request for the API 400 is received will be described with reference to FIG. 5. This processing is started in response to an activation of the server function by the digital camera 100. This processing may be realized by, for example, the control unit 101 of the digital camera 100 executing a program that is stored in the non-volatile memory 103. However, some or all of the following processing may be performed by dedicated hardware.

After the start of the processing, the digital camera 100 waits for a request from an external device (step S501). When the digital camera 100 receives a request from an external device (YES in step S501), the digital camera 100 processes the request (step S502). In the processing of the request, the digital camera 100 first determines whether CORS processing is enabled in the digital camera 100 itself (step S503). The digital camera 100 performs this determination, for example, by referring to the work memory 104 and confirming whether a setting value that indicates that CORS processing is enabled is stored in the work memory 104. If a setting value that indicates that CORS processing is enabled is stored in the work memory 104, the digital camera 100 determines that CORS processing is enabled. Meanwhile, if a setting value that indicates that CORS processing is enabled is not stored in the work memory 104, the digital camera 100 determines that CORS processing is disabled. If a setting value that indicates that CORS processing is disabled is stored in the work memory 104, the digital camera 100 may determine that CORS processing is disabled. If a setting value that indicates that CORS processing is disabled is not stored in the work memory 104, the digital camera 100 may determine that CORS processing is enabled. The enabling or disabling of CORS processing can be set by an external device by using the API 402.

If the digital camera 100 determines that CORS processing is disabled (NO in step S503), the digital camera 100 performs processing in accordance with the request (step S504). In response to a request for the API 401, for example, the digital camera 100 generates a response message in the JSON format by using URLs of APIs that are published by the digital camera 100 itself. In response to a request for the API 405, for example, the digital camera 100 analyzes the request body and executes shutter operation processing in accordance with the request. Then, the digital camera 100 generates a response message in the JSON format in accordance with a shutter operation result. The digital camera 100 thus executes processing up to immediately before response transmission. Then, the digital camera 100 transmits the generated response message (step S511) and terminates the processing.

If the digital camera 100 determines that CORS processing is enabled (YES in step S503), the digital camera 100 determines whether the request includes an Origin header (step S505). If the digital camera 100 determines that the request does not include an Origin header (NO in step S505), since the request is not a request from a different origin, the digital camera 100 executes processing that corresponds to the request without performing CORS processing (step S504). Then, the digital camera 100 transmits a response message that has been generated in that processing (step S511) and terminates the processing.

If the digital camera 100 determines that the request includes an Origin header (YES in step S505), the digital camera 100 compares a value of the Origin header with a setting value of an allowed origin that is held in the work memory 104 (step S506). Then, the digital camera 100 determines whether to allow a response based on a result of the comparison (step S507). An allowed origin can be set by an external device by using the API 403. If a setting value of an allowed origin is "*", a response to all origins is allowed. If a value other than "*" is set, each origin is divided into a scheme, a host, and a port number, each is compared, and if all are the same, a response is allowed.

If the digital camera 100 determines to allow a response (YES in step S507), the digital camera 100 performs processing in accordance with the request (step S508). Since contents of processing here is the same as those of step S504, a description thereof will be omitted. Upon completion of the processing, the digital camera 100 adds an "Access-Control-Allow-Origin" header to the header of the response message (step S509). In the response message, the value of the Origin header of the request is used as the value of the header. Then, the digital camera 100 transmits the generated response message (step S511) and terminates the processing.

If the digital camera 100 determines not to allow a response (NO in step S507), the digital camera 100 does not perform processing that accords with the request and also does not add an "Access-Control-Allow-Origin" header to the header of the response. Then, the digital camera 100 generates a response message in which a status code is set to "403 Forbidden" (step S510), transmits that response message (step S511), and terminates the processing.

<Communication Sequence at Time of Execution of Web Application>

Next, a flow of processing for operating the digital camera 100 from the smart device 200 by using the web application 302 in the system of FIG. 1 will be described with reference to FIG. 6. It is assumed that a connection has been established in advance between the digital camera 100 and the smart device 200 and between the smart device 200 and the web server 300. In one example, the smart device 200 may connect to a network, such as the Internet, via a public network or the like and connect to the web server 300 via the network while directly connecting to the digital camera 100 by a near-field or close proximity wireless communication. Upon receiving a request from the smart device 200, the digital camera 100 executes the processing that has been described with reference to FIG. 5 and transmits a response to the smart device 200.

In FIG. 6, the smart device 200 first transmits a request for the API 401 to the digital camera 100 (step S601). In the present embodiment, this request is generated in the application 301. This request is not essential for performing CORS settings but may be performed to confirm that the smart device 200 is capable of communicating with the digital camera 100 and to confirm a support state of the API. Upon receiving this request, the digital camera 100 processes the request in step S504 of FIG. 5 based on that CORS processing is not enabled at this point in time and returns a response to the smart device 200 (step S602).

Next, the smart device 200 transmits a request for the API 403 to the digital camera 100 (step S603). This request is also generated by the application 301. In this request, the origin of the web server 300 is designated as an allowed origin. In one example, a wildcard "*" may be used for designating an origin. The origin of the web server 300 may be incorporated in advance into the application 301, or a mechanism for inputting an origin in the application 301 may be provided and designation may be made by using that mechanism. Upon receiving this request, the digital camera 100 processes the request in step S504 of FIG. 5 based on that CORS processing is not enabled at this point in time and returns a response to the smart device 200 (step S604). If procedures in steps S603 and S604 are normally processed, a setting value of CORS processing is held in the work memory 104 of the digital camera 100.

The smart device 200 transmits a request for the API 402 to the digital camera 100 (step S605). This request is also generated by the application 301. This request is transmitted from the smart device 200 to enable or disable CORS processing of the digital camera 100. Here, it is assumed that CORS processing of the digital camera 100 is enabled. Upon receiving this request from the smart device 200, the digital camera 100 processes the request in step S504 based on that the CORS processing is not enabled at this point in time and returns a response to the smart device 200 (step S606). If the procedures of steps S605 and S606 are processed normally, the digital camera 100 holds the information that indicates whether CORS processing is enabled or disabled in the work memory 104, and when a subsequent request is received, the digital camera 100 determines whether to perform CORS processing by using this information.

The smart device 200 transmits to the web server 300 a request for obtaining a web application (step S607). This request is generated by the web browser 303. When the web server 300 receives the request, the web server 300 returns a file in a response (step S608). The web browser 303 analyzes the obtained file by a rendering engine or the like and displays it on a screen.

Next, the smart device 200 transmits a request for the API 405 to the digital camera 100. This request is generated based on the web application 302 that has been obtained from the web server 300. If this request does not meet a certain condition, this request is not transmitted immediately, and a preflight request is transmitted by the web browser 303. In the example of FIG. 6, it is assumed that the web browser 303 transmits this preflight request. That is, the smart device 200 transmits a preflight request that is related to the API 405 to the digital camera 100 (step S609). This request is generated by the web browser 303 and is given an "Origin" header. The value of the header is set to the origin (http://example.com) of the web server 300. Upon receiving the request, the digital camera 100 processes the request in accordance with FIG. 5. Here, since the CORS processing is enabled and the request is given an Origin header, the digital camera 100 determines whether to allow a response by comparing the value of the Origin header and a setting value of an allowed origin. Here, the digital camera 100 holds the origin of the web server 300 as a setting value of an allowed origin based on the request that has been received in step S603. Therefore, the digital camera 100 returns a response with an "Access-Control-Allow-Origin" header added in accordance with step S509 (step S610). The value of the header here is set to the value (http://example.com) of the Origin header that is included in the request.

When the web browser 303 receives a response that includes an "Access-Control-Allow-Origin" header in step S610, the web browser 303 transmits a request for the API 405 to the digital camera 100 (step S611). This request is generated by the web browser 303 and is given an Origin header. The value of the header is set to the origin (http://example.com) of the web server 300. Upon receiving this request, the digital camera 100 processes the received request in accordance with FIG. 5. Here, since the CORS processing is enabled and the request is given an Origin header, the digital camera 100 determines whether to allow a response by comparing the value of the Origin header and a setting value of an allowed origin. The digital camera 100 executes processing, such as a full press of the shutter, in accordance with step S508 and returns a response to which an "Access-Control-Allow-Origin" header has been added (step S612). The value of the header here is set to the value (http://example.com) of the Origin header that is included in the request.

As described above, in the present embodiment, the CORS settings of the HTTP server function of the digital camera 100 can be performed by another device via an API that has been published by the digital camera 100. This makes it possible to easily perform the CORS settings in an electronic device in which it is not easy to use an input member, such as a console, for example.

(First Variation)

Figure 7:
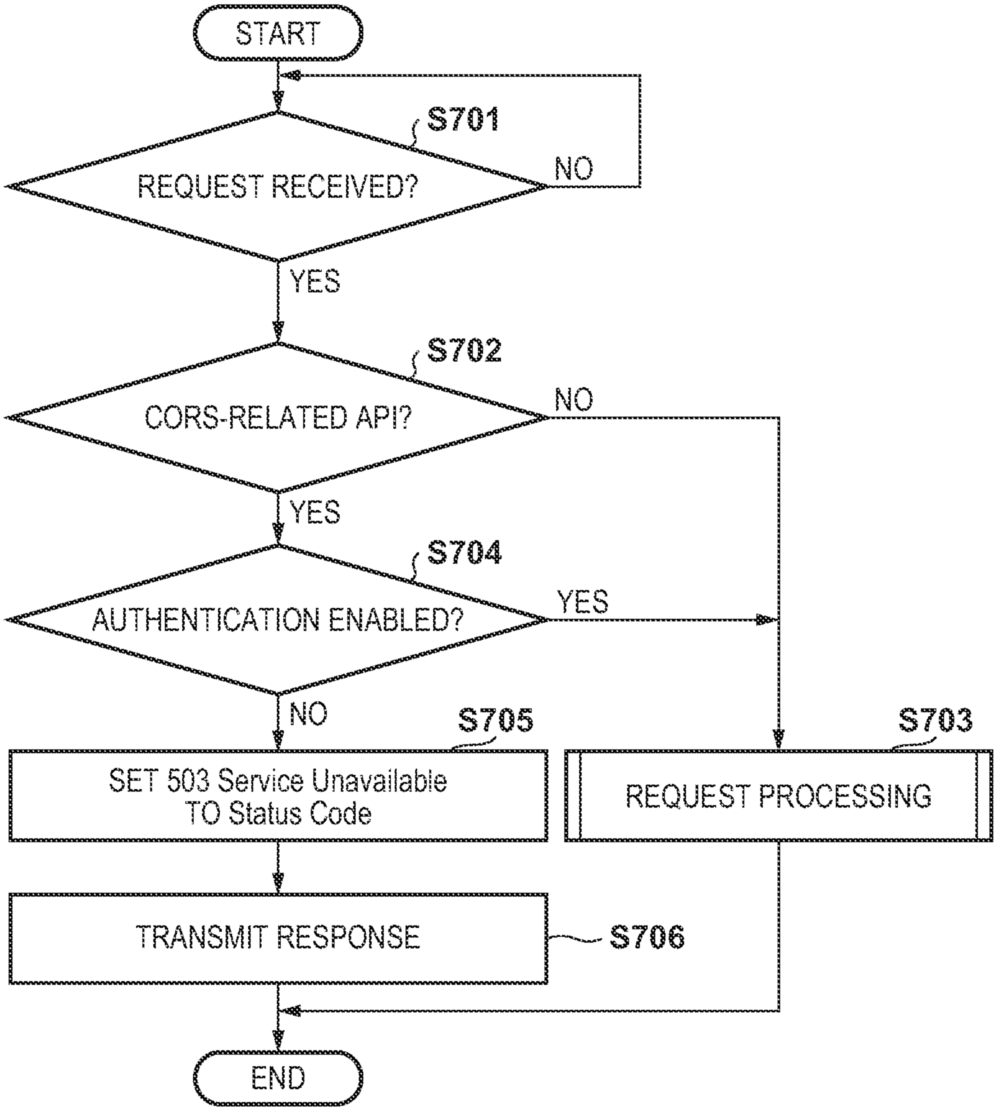
FIG. 7 is a diagram illustrating an example of a flow of processing to be performed by the digital camera.

A configuration may be taken so as to perform authentication when an external electronic device performs the CORS settings of the HTTP server function in the digital camera 100. For example, a configuration may be taken so as to allow usage of an API for CORS settings only for electronic devices for which authentication has been successful. Authentication may be performed by basic authentication, digest authentication, or the like, for example. In one example, the digital camera 100 may prevent usage of an API for CORS settings if an authentication function of the digital camera 100 is not enabled and allow usage of the API for CORS settings only if the authentication function of the digital camera 100 is enabled. That is, if the authentication function of the digital camera 100 (HTTP server function) is disabled, the digital camera 100 does not allow usage of the API as described above, and if the authentication function is enabled the digital camera 100 allows usage of the API such that an external device for which authentication has been successful can use that API. An example of a flow of processing of the digital camera 100 in such a case will be described with reference to FIG. 7.

The digital camera 100 waits to receive an incoming request from an external device (step S701), and if the digital camera 100 receives a request (YES in step S701), the digital camera 100 confirms whether the requested API is a CORS-related API (step S702). A CORS-related API is an API for performing settings for CORS processing, such as the API 402, the API 403, and the API 404, which have been indicated in FIG. 4, for example. If the digital camera 100 determines that the requested API is not a CORS-related API (NO in step S702), the digital camera 100 executes the same processing as in step S502 (step S703). Meanwhile, if the digital camera 100 determines that the requested API is a CORS-related API (YES in step S702), the digital camera 100 confirms whether the authentication function of the digital camera 100 is enabled (step S704). At this time, the digital camera 100 may also confirm whether the authentication function of the smart device 200, which is the request source, is enabled, for example. If the digital camera 100 confirms that the authentication function is enabled (YES in step S704), the digital camera 100 executes the same processing as in step S502 (step S703). Meanwhile, if the digital camera 100 confirms that the authentication function is not enabled (NO in step S704), the digital camera 100 transmits a response in which the status code is set to "503" to indicate that the service is unavailable and terminates the processing (steps S705 and S706).

As described above, the digital camera 100 may allow execution of an API for CORS settings on the condition that the authentication function of the server function of the digital camera 100 is enabled. This makes it so that authentication is used in order to perform the CORS settings, and it becomes possible to prevent a change of CORS settings from an unauthenticated external device.

(Second Variation)

In the embodiments described above, the CORS settings are common across all of the APIs that are published by the digital camera 100. That is, for example, an origin that has been set as an allowed origin is treated as an origin to be allowed for all of the APIs that are published by the digital camera 100. Meanwhile, for example, there may be cases where a request from a different origin is not to be allowed for some APIs. Therefore, information that indicates whether to perform CORS processing for each API may be provided. Based on this information, the digital camera 100 may confirm whether a requested API is a target of CORS processing. Then, the digital camera 100 performs CORS processing as described above only for an API that is a target of CORS processing. A configuration may also be taken so as to change an allowed origin and a method for each API. For this, individual CORS settings may be provided for each API, independently of the HTTP server-wide CORS settings, for example. If individual CORS settings have been performed for the requested API, the digital camera 100 may perform processing by using API-specific CORS settings, rather than using server-wide CORS settings.

FIG. 8 illustrates examples of APIs in such a case. In FIG. 8, an API 801 (/cors/api/corssetting) can be used for designating whether the digital camera 100 enables or disables CORS processing for a designated API. The external device adds to a request body a target API and information that indicates whether CORS processing is enabled or disabled and transmits a request for the API 801 by the PUT method. The digital camera 100 holds information of the request in the work memory 104. This information is used for the digital camera 100 to determine whether CORS processing at the time of subsequent request reception is to be performed. When the digital camera 100 successfully completes storing of the information, the digital camera 100 adds, to a response body, a changed state of CORS processing and returns to the external device a response in which a status code has been set to "200 OK".

An API 802 (/cors/api/origin) is used for designating whether to allow a response for a request from a different origin at the time of CORS processing for a designated API. In the API 802, an allowed origin is designated. The external device adds to a request body a target API and an allowed origin for that API and transmits a request for the API 802 by the PUT method. The digital camera 100 holds information of the request in the work memory 104. This information is used for when the digital camera 100 determines whether to allow a response in the CORS processing at the time of subsequent request reception. When the digital camera 100 successfully completes storing of the information, the digital camera 100 adds, to a response body, a changed allowed origin and returns to the external device a response in which a status code has been set to "200 OK".

An API 803 (/cors/api/header) is used for designating whether to allow a response for a request from a different origin at the time of CORS processing for a designated API. In the API 803, an allowed header is designated. The external device adds to a request body a target API and a key and value of an allowed header and transmits a request for the API 803 by the PUT method. The digital camera 100 holds information of the request in the work memory 104. This information is used for when the digital camera 100 determines whether to allow a response in the CORS processing at the time of a subsequent request reception. When the digital camera 100 successfully completes storing of the information, the digital camera 100 adds, to a response body, an added allowed header and returns to the external device a response in which a status code has been set to "200 OK".

An example of a flow of processing of the digital camera 100 in such a case will be described with reference to FIG. 9. The digital camera 100 waits for an incoming request (step S901) and if a request has been received (YES in step S901), the digital camera 100 confirms whether individual CORS settings are performed for the requested API (step S902). For example, the digital camera 100 determines that API-specific CORS settings have been changed when a setting value of an API-specific "allowed origin" for which settings are performed in the API 802 has been changed from an initial value (NULL). For example, the digital camera 100 also determines that API-specific CORS settings have been changed when a setting value of an API-specific "allowed header" for which settings are performed in the API 803 has been changed from an initial value (NULL). If the digital camera 100 determines that API-specific CORS settings have not been performed (NO in step S903), the digital camera 100 processes the request by using the server-wide CORS settings (step S904). This processing is performed in the same manner as in step S502 of FIG. 5. Meanwhile, if the digital camera 100 determines that API-specific CORS settings have not been performed (YES in step S903), the digital camera 100 processes the request by using the API-specific CORS settings (step S905). Regarding this processing, information that is used for the determination during the processing is only changed from server-wide information to API-specific information, and the contents of the processing are similar to those of the processing of step S502 in FIG. 5.

In this way, the digital camera 100 can set different CORS processing for each API. In the above-described example of processing, by prioritizing the API-specific CORS settings over the server-wide CORS settings, API-specific CORS settings are used. Meanwhile, for example, a configuration may be taken so as to use the server-wide CORS settings and API-specific CORS settings in combination. In one example, the digital camera 100 may allow a response only for origins and headers that are designated in both server-wide CORS settings and API-specific CORS settings. The digital camera 100 may also allow a response for origins and headers that are designated in either the server-wide CORS settings or the API-specific CORS settings.

(Third Variation)

In the above-described embodiments, it has been described that the CORS settings that have been set by an API is held in the work memory 104 of the digital camera 100 and are referred to during CORS processing. These setting values may be stored in the non-volatile memory 103 of the digital camera 100, and by referring to these, it is possible to continue to use the same setting values even when the main body of the digital camera 100 is restarted. Meanwhile, such a configuration may result in maintaining unnecessary CORS settings. Therefore, in one example, the digital camera 100 may initialize CORS settings when the server function is started. In such a case, when the CORS settings are to be used again, the digital camera 100 executes an API of CORS settings again by using a procedure as described in the above-described embodiments.

An example of a flow of processing of the digital camera 100 in a case where such an initialization is performed will be described with reference to FIG. 10. Upon starting an HTTP server function (step S1001), the digital camera 100 initializes the CORS setting values that are stored in the non-volatile memory 103 (step S1002). Regarding the information that indicates enabling or disabling of CORS settings, which is set by the API 402, the value is set to "disabled" as an initial value. Regarding information that is set by the API 403 or the API 404 and is used for when determining whether a request from a different origin is allowed in the CORS processing, NULL is set as an initial value, for example. After initializing the setting values, the digital camera 100 waits for reception of a request (step S1003), and when the digital camera 100 receives a request (YES in step S1003), the digital camera 100 processes the request (step S1004) in the same manner as in step S502, for example. The CORS setting values may be initialized when the HTTP server function is started or the CORS setting values may be initialized when the HTTP server function is terminated. Here, the HTTP server function refers to a predetermined function that is associated with an API that is related to CORS settings. The activation or termination of the HTTP server function is performed at start up or shut down of the digital camera 100 but may be performed upon another trigger, such as an instruction for activation or termination by a user operation, for example. Alternatively, if processing based on the CORS setting values has not been performed for a predetermined period of time, for example, initialization may be performed. That is, initialization can be performed at a fixed timing so that CORS settings are not unnecessarily maintained. Alternatively, for example, the CORS settings may be initialized when the user explicitly performs an initialization operation or a configuration may be taken so as not to automatically perform initialization when the user explicitly performs a setting such that initialization processing is not performed.

By thus initializing the CORS settings when the digital camera 100 activates the server function, it is possible to prevent unnecessary CORS settings from being maintained.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC) or the like) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors, circuitry, or combinations thereof (e.g., central processing unit (CPU), micro processing unit (MPU), or the like), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2022-003253, filed Jan. 12, 2022 which is hereby incorporated by reference herein in its entirety.

What is claimed is:

1. An electronic device comprising:

one or more processors; and one or more memories that store computer-readable instructions for causing, when executed by the one or more processors, the electronic device to perform operations comprising:

functioning as a web server;

providing, to an external device, Web Application Programming Interfaces (WEB APIs) including at least a cross-origin resource sharing (CORS) enablement-setting WEB API for switching whether to enable or disable CORS in the web server from outside via a Hypertext Transfer Protocol (HTTP) request and an allowed-origin-setting WEB API for accepting information that designates an allowed origin under CORS, the allowed-origin-setting WEB API being different from the CORS enablement-setting WEB API; and enabling the CORS in response to receiving a first HTTP request in which a first Uniform Resource Locator (URL) of the CORS enablement-setting WEB API is designated and a first argument indicating that the CORS is to be enabled is designated, wherein the CORS enablement-setting WEB API is configured not to accept information designating an allowed origin.

2. The electronic device according to claim 1, wherein the operations further comprise disabling the CORS in response to receiving a second HTTP request in which the first URL of the CORS enablement-setting WEB API and a second argument indicating the CORS is to be disabled, wherein the first argument consists only of a character string {"value": "enable"} described in a Javascript Object Notation (JSON) format, and the first HTTP request includes no other argument except for the first argument, and wherein the second argument is an argument consisting of a character string {"value": "enable"} described in the JSON format, the second HTTP request includes no other argument except for the second argument.

3. The electronic device according to claim 1, wherein the operations further comprise performing setting that allows a response for an HTTP request from an origin designated by a third HTTP request directed to the allowed-origin-setting WEB API.

4. The electronic device according to claim 1, wherein in the providing the WEB APIs, a third WEB API for accepting information that designates an allowed header according to CORS is provided, and the operations further comprise performing a setting that allows a response for an HTTP request that includes a header designated in a fourth HTTP request for the third API has been received.

5. The electronic device according to claim 1, wherein in a case where an authentication function is enabled in the electronic device, the first HTTP request for the CORS enablement-setting WEB API is allowed, and in a case where the authentication function is not enabled in the electronic device, the first HTTP request for the CORS enablement-setting WEB API is not allowed.

6. The electronic device according to claim 1, wherein a setting of enablement of the CORS is stored in a work memory, and in a case where a power state of the electronic device in which the CORS is enabled is changed to a power-off state and then the electronic device is transitioned to a power-on state, operation as the web server is started in an initialized state in which the CORS is disabled.

7. The electronic device according to claim 6, wherein the electronic device is handheld device.

8. The electronic device according to claim 6, wherein the electronic device is camera device.

9. A control method to be executed by an electronic device, the method comprising:

functioning as a web server;

providing, to an external device, Web Application Programming Interfaces (WEB APIs) including at least a cross-origin resource sharing (CORS) enablement-setting WEB API for switching whether to enable or disable CORS in the web server from outside via a Hypertext Transfer Protocol (HTTP) request and an allowed-origin-setting WEB API for accepting information that designates an allowed origin under CORS, the allowed-origin-setting WEB API being different from the CORS enablement-setting WEB API; and enabling the CORS in response to receiving a first HTTP request in which a first Uniform Resource Locator (URL) of the CORS enablement-setting WEB API is designated a first argument indicating that the CORS is to be enabled is designated, wherein the CORS enablement-setting WEB API is configured not to accept information designating an allowed origin.

* * * * *